(12) United States Patent
Couchman et al.

(10) Patent No.: US 6,538,431 B2
(45) Date of Patent: Mar. 25, 2003

(54) PIPELINE PIGS

(75) Inventors: Peter Allan Couchman, Newcastle Upon Tyne (GB); David Carl Maughan, Northumberland (GB)

(73) Assignee: PII Limited, Northumberland (GB)

( * ) Notice: Subject to any disclaimer, the term of this patent is extended or adjusted under 35 U.S.C. 154(b) by 176 days.

(21) Appl. No.: 09/730,852

(22) Filed: Dec. 7, 2000

(65) Prior Publication Data

US 2001/0003223 A1 Jun. 14, 2001

(30) Foreign Application Priority Data

Dec. 8, 1999 (GB) ............................................. 9929058

(51) Int. Cl.⁷ ......................... B08B 9/055; G01N 27/72; G01N 27/82
(52) U.S. Cl. ............. 324/220; 15/104.061; 15/104.063; 15/104.19
(58) Field of Search ..................... 15/104.061, 104.063, 15/104.05, 104.17, 104.18, 104.16, 104.19, 104.2; 324/220, 221, 242, 262; 104/138.2

(56) References Cited

U.S. PATENT DOCUMENTS

| | | | | |
|---|---|---|---|---|
| 2,972,156 A | * | 2/1961 | Nooy ..................... | 15/104.061 |
| 3,107,379 A | * | 10/1963 | Hill ........................ | 15/104.061 |
| 4,072,894 A | * | 2/1978 | Barton ........................ | 324/221 |
| 4,345,350 A | * | 8/1982 | Burd ..................... | 15/104.063 |
| 6,232,773 B1 | * | 5/2001 | Jacobs et al. ................ | 324/220 |

FOREIGN PATENT DOCUMENTS

| | | | |
|---|---|---|---|
| GB | 2 086 051 A | 5/1982 | |
| GB | 2 326 209 A | 12/1998 | |
| SU | 671886 | * 7/1979 | .............. 15/104.19 |
| SU | 797802 | * 1/1981 | ............ 15/104.061 |
| SU | 1417943 | * 8/1988 | ............ 15/104.061 |
| SU | 1574289 | * 6/1990 | ............ 15/104.061 |

* cited by examiner

Primary Examiner—Gary K. Graham
(74) Attorney, Agent, or Firm—Larson & Taylor PLC

(57) ABSTRACT

A pipeline pig includes a central body member, a plurality of circumferentially spaced return path elements surrounding said body member and each extending axially relative to the body member, each return path element including a pair of axially spaced magnets from each of which projects a metallic bristle set, and means for connecting the return path elements to the body member whereby the free ends of the bristles, in use, resiliently engage the inner wall of the pipeline, the connecting means comprising a first carrier member mounted on, to be axially slidable relative to, the front extent of the body member and resiliently urged towards the rear of the body member, a second carrier member mounted on, to be axially slidable relative to, the rear extent of the body member and resiliently urged towards the front of the body member, and, for each return path element, a front link pivotally interconnecting the front of the return path element and the first carrier member, and a rear link pivotally interconnecting the rear of the return path element and the second carrier member.

7 Claims, 5 Drawing Sheets

0% DEFLECTION

10% DEFLECTION

50% DEFLECTION

PIPELINE PIGS

TECHNICAL FIELD

This invention relates to pipeline pigs, and more particularly to such pigs for inspecting the condition of metallic pipelines to determine corrosion or the like.

BACKGROUND OF THE INVENTION

Current pipeline inspection vehicles are usually one of two main types. The first type incorporates a fixed central body and a 'sweeps brush' arrangement with long bristles which resiliently engage the inner wall of the pipeline.

The second type comprises a central body carrying a plurality of circumferentially spaced, individual sprung elements each provided with relatively short bristles which are urged into engagement with the inner wall of the pipeline, the elements creating a plurality of magnetic return paths the change in flux in which is used to determine the condition of the pipeline.

Both the above types of inspection vehicles are capable of monitoring the condition of pipelines of relatively constant diameter, while the second type can also be used in pipelines with different diameters within the range of sprung movement of the return path elements, providing the wall of the pipeline is continuous.

However, problems arise with this second type when, for example, passing T-connections to the pipeline under inspection, or if there are dents or non-circular portions to the pipeline. In such circumstances, and as the pig passes the T-connection, some of the sprung return path elements are released into the T-connection, and can suffer considerable damage on impact with the wall of the connection.

SUMMARY OF THE INVENTION

It would be desirable to be able to provide a pipeline pig capable of inspecting pipelines within a range of diameters and which incorporate T-connections and the like, and dents or other non-circular features without the risk of damage to the pig.

According to the present invention there is provided a pipeline pig including a central body member, a plurality of circumferentially spaced return path elements surrounding said body member and each extending axially relative to the body member, each return path element including a pair of axially spaced magnets from each of which projects a metallic bristle set, and means for connecting the return path elements to the body member whereby the free ends of the bristles, in use, resiliently engage the inner wall of the pipeline, characterised in that said connecting means comprise a first carrier member mounted on, to be axially slidable relative to, the front extent of the body member and resiliently urged towards the rear of the body member, a second carrier member mounted on, to be axially slidable relative to, the rear extent of the body member and resiliently urged towards the front of the body member, and, for each return path element, a front link pivotally interconnecting the front of the return path element and the first carrier member and a rear link pivotally interconnecting the rear of the return path element and the second carrier member.

It will be appreciated that, with such an arrangement, the combined effect of the resilient urging of the first and second carrier members towards each other, in combination with the pivotal linkages between the carrier members and the return path elements, is to urge the bristle sets into engagement with the inner wall of the pipeline.

Furthermore, the nature of the link connections at the front and rear of the pig is such as to ensure that the front ends of the return path elements and the rear ends of the return path elements are constrained to adopt circular configurations in the manner of umbrella-type mechanisms. The diameters of the front and rear circular configurations need not be the same, whereby the pig of the invention is particularly suited to use in a tapering pipeline.

It will also be appreciated that, as the return path elements are constrained to move together with one another, any element passing over the entrance to a T-connection will be prevented from entering that connection, and damage thereto will be prevented.

In the event that one or more return path elements engage with a dent or other non-circular feature on the pipeline inner wall, that element will be moved radially inwardly to accommodate the dent. As a consequence of the linkages, all the other elements will be correspondingly moved radially inwardly whereby the circular configurations of the front and rear ends of the elements are maintained. The lengths of the bristles of the bristle sets are chosen such as to ensure that contact of the free ends of the bristles with the inner wall of the pipeline is maintained for the range of pipeline diameters and dent dimensions anticipated.

In a preferred embodiment of the invention, at least the front and rear extents of the central body member are hollow and of circular cross-section, the front and rear carrier members each being of generally cylindrical shape to be a sliding fit in the front and rear extents of the body member respectively.

Conveniently the front and rear carrier members are resiliently urged towards one another by one or a plurality of coil springs reacting between the front of the body member and the front of the first carrier member and between the rear of the body member and the rear of the second carrier member respectively.

One end of each link is pivotally connected to the associated carrier member and the other end of each link is pivotally connected to the associated return path element, the front and rear extents of the body member being provided with a plurality of axially extending, circumferentially spaced slots one for each link to accommodate the axial sliding movement of the one ends of the links.

DETAILED DESCRIPTION OF THE INVENTION

Figure 1:
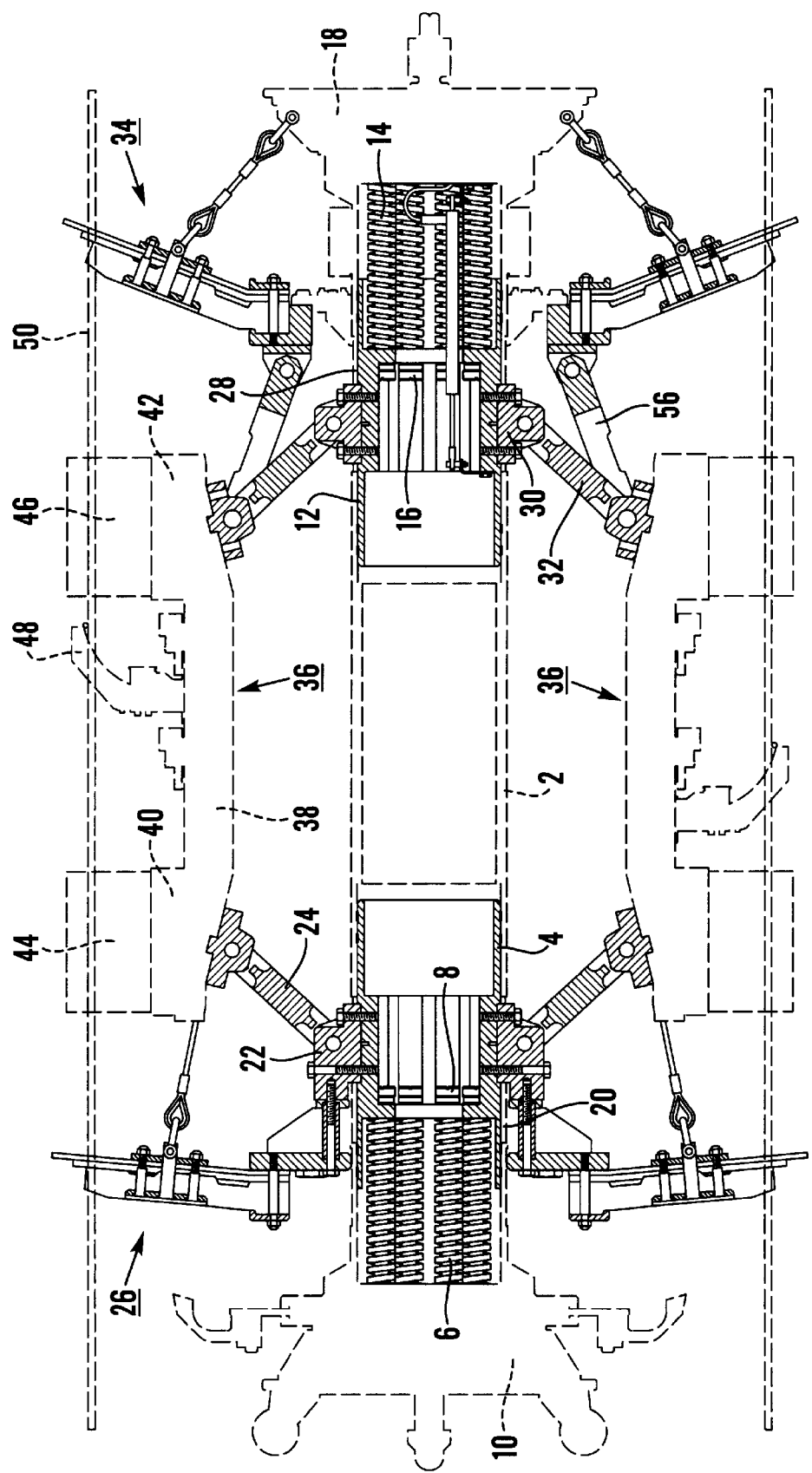
FIG. 1 is a longitudinal section through a pig according to the invention located in a first pipeline.

Referring to the drawings, the illustrated pipeline pig includes a central cylindrical body 2 in the hollow front end extent of which is mounted a front slider 4 resiliently urged by a plurality of coil springs 6 towards a rearmost position abutting the ends of spring rods 8 secured into a front end member 10 of the body 2. The springs 6 react between a wall within the front end member 10 and the front wall of the slider 4.

A rear slider 12 is mounted in the hollow rear end extent of the body 2 and is resiliently urged by a plurality of coil springs 14 towards a foremost position abutting the ends of spring rods 16 secured into a rear end member 18 of the body 2. The springs 14 react between a wall within the rear end member 18 and the rear wall of the slider 12.

Eight axially extending, circumferentially spaced slots 20 are formed in the front end extent of the body 2 through each of which projects an associated link block 22 secured to the slider 4. One end of an associated link arm 24 is pivotally mounted to each block 22, while a disc-like front drive element indicated generally at 26 is also secured to each link block 22 whereby said element 26 is mounted on, to be axially movable with, the slider 4, the periphery of the element 26 being adapted to sealingly engage the inner wall of a pipeline accommodating the pig to provide front drive to the pig.

In a similar manner to that at the front end extent of the body 2, eight axially extending, circumferentially spaced slots 28 are formed in the rear end extent of the body 2, an associated link block 30 secured to the slider 12 extending through each slot 28. One end of an associated link arm 32 is pivotally mounted to each block 30, while a disc-like rear drive element indicated generally at 34 is secured to the rear end extent of the body 2 rearwardly of the slots 28. The periphery of the element 34 is adapted to engage the inner wall of the pipeline to provide rear drive to the pig.

The illustrated pig further includes eight return path elements indicated generally at 36. Each element 36 consists of an axially-extending metallic support portion 38, a pair of magnets 40, 42 one at each end of the support portion 38 and a pair of metallic bristle sets 44, 46 one projecting radially outwardly from each magnet 40, 42. A sensor unit 48 is provided for each return path element 36.

The return path elements 36 and sensors 48 operate in conventional manner, based on magnetic flux leakage, to monitor the condition of the associated pipeline.

The other ends of the link arms 24 are each pivotally mounted to the front regions of associated ones of the support portions 38 of the elements 36, while the other ends of the link arms 32 are each pivotally mounted to the rear regions of associated ones of the support portions 38 of the elements 36, the lengths of the arms 24, 32 being the same.

It will thus be appreciated that the front regions of the support portions 38 adopt a circular configuration about the centerline of the body 2 and, on sliding movement of the slider 4 relative to the body 2, are constrained to move together in the manner of an umbrella mechanism to retain said circular configuration the diameter of which is varied in dependence upon the position of the slider 4 in the body 2. The maximum diameter is achieved with the slider 4 abutting the ends of the spring rods 8, the diameter reducing as the slider 4 moves forwards within the body 2 against the bias of the springs 6.

Similarly the rear regions of the support portions 38 adopt a circular configuration and are also constrained to move together to retain said circular configuration the diameter of which varies in dependence upon the position of the slider 12 in the body 2, and which may be different from the diameter of the circle embracing the front regions of the portions 38 (see below).

Referring to FIG. 1 there is shown in dotted lines a pipeline 50 the nominal base diameter of which is 1219 mm (48 inches), the thickness of the wall of which is 10 mm, and the internal diameter of which is 1199 mm. The free ends of the bristles of the sets 44, 46 are urged into engagement with the inner wall of the pipeline by virtue of the springs 6, 14 and the link arms 24, 32 which typically make angles of about 45° with the centerline of the body 2. The dimensions and forces involved are typically chosen such that the bristles are deflected by about 10% of their length in the largest diameter pipeline to be inspected.

In the case of a parallel walled, continuous pipeline, the return paths are parallel with the centerline of the pipeline and the diameters of the circles through the front and rear regions of the support portions 38 are the same.

Figure 2:
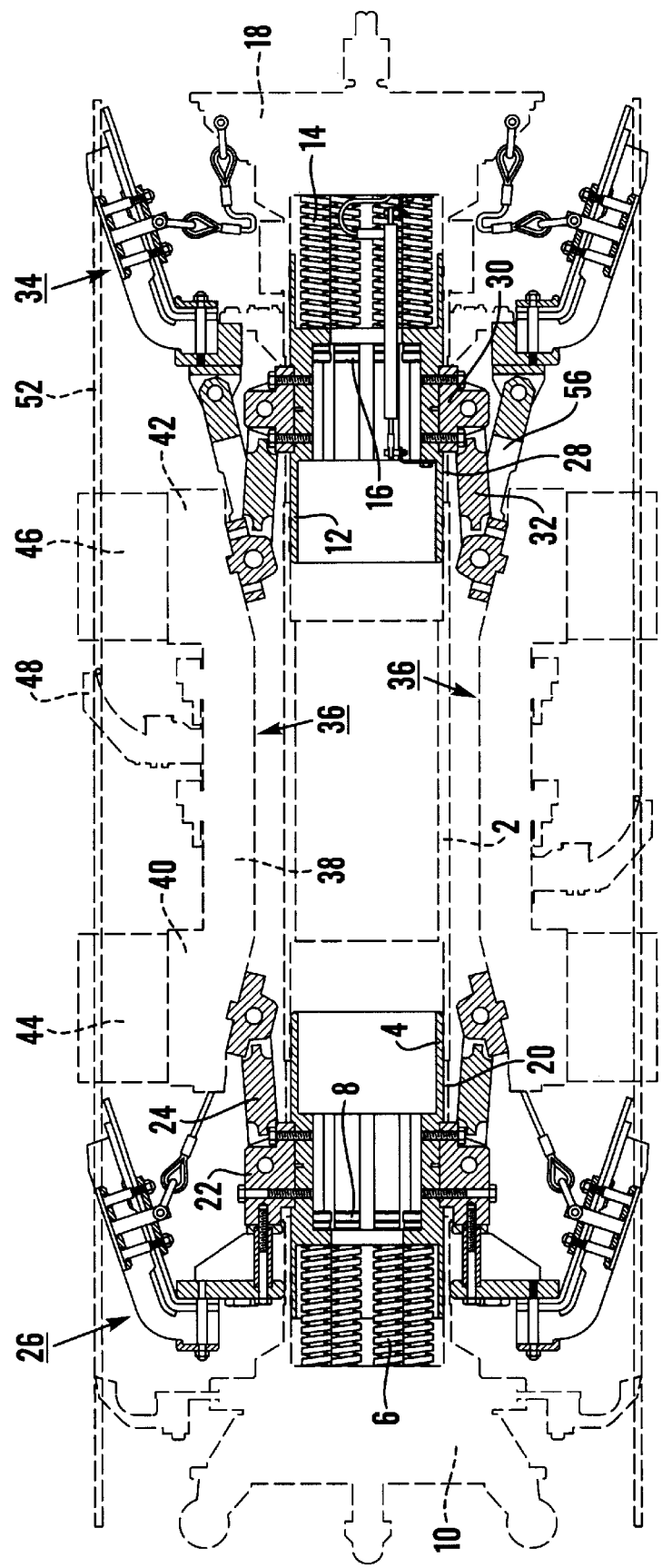
FIG. 2 is a longitudinal section through the pig of FIG. 1 located in a second pipeline of smaller diameter than the first.

Referring to FIG. 2 there is shown in dotted lines a pipeline 52 the nominal bore of which is 914 mm (36 inches) inspection of which can be achieved with the same pig as shown in FIG. 1. In this instance, and in view of the smaller diameter of the pipeline, the sliders 4 and 12 have been moved away from the associated spring rod ends 8, 16 respectively against the bias of the spring 6, 14, the link arms 24, 32 making a smaller angle with the centerline of the body 2, and the free ends of the bristles of the bristle sets 44, 46 engage the inner wall of the pipeline again with a deflection of about 10% of their length.

Figure 3:
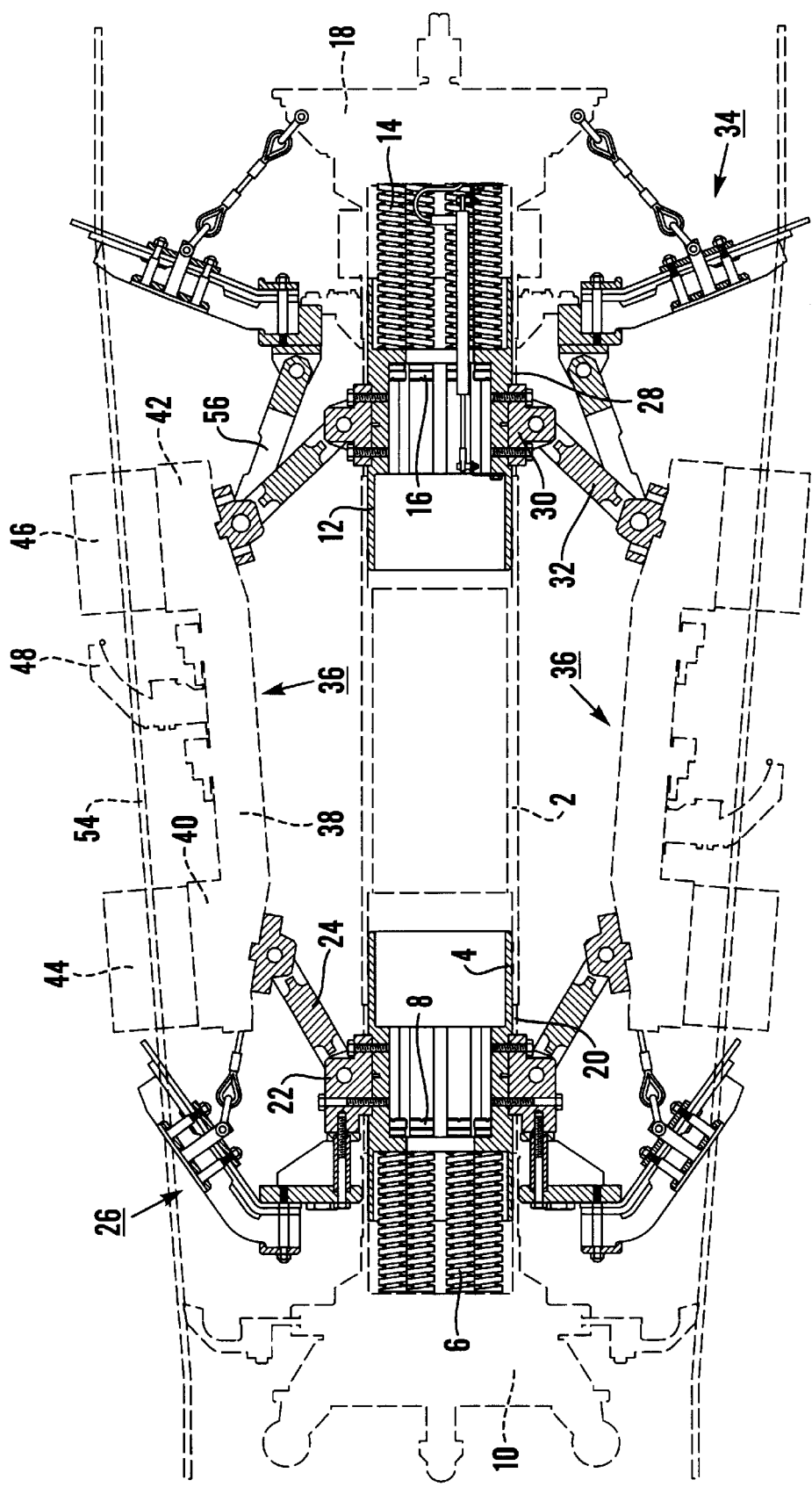
FIG. 3 is a longitudinal section through the pig of FIGS. 1 and 2 in a tapering pipeline.
Figure 4:
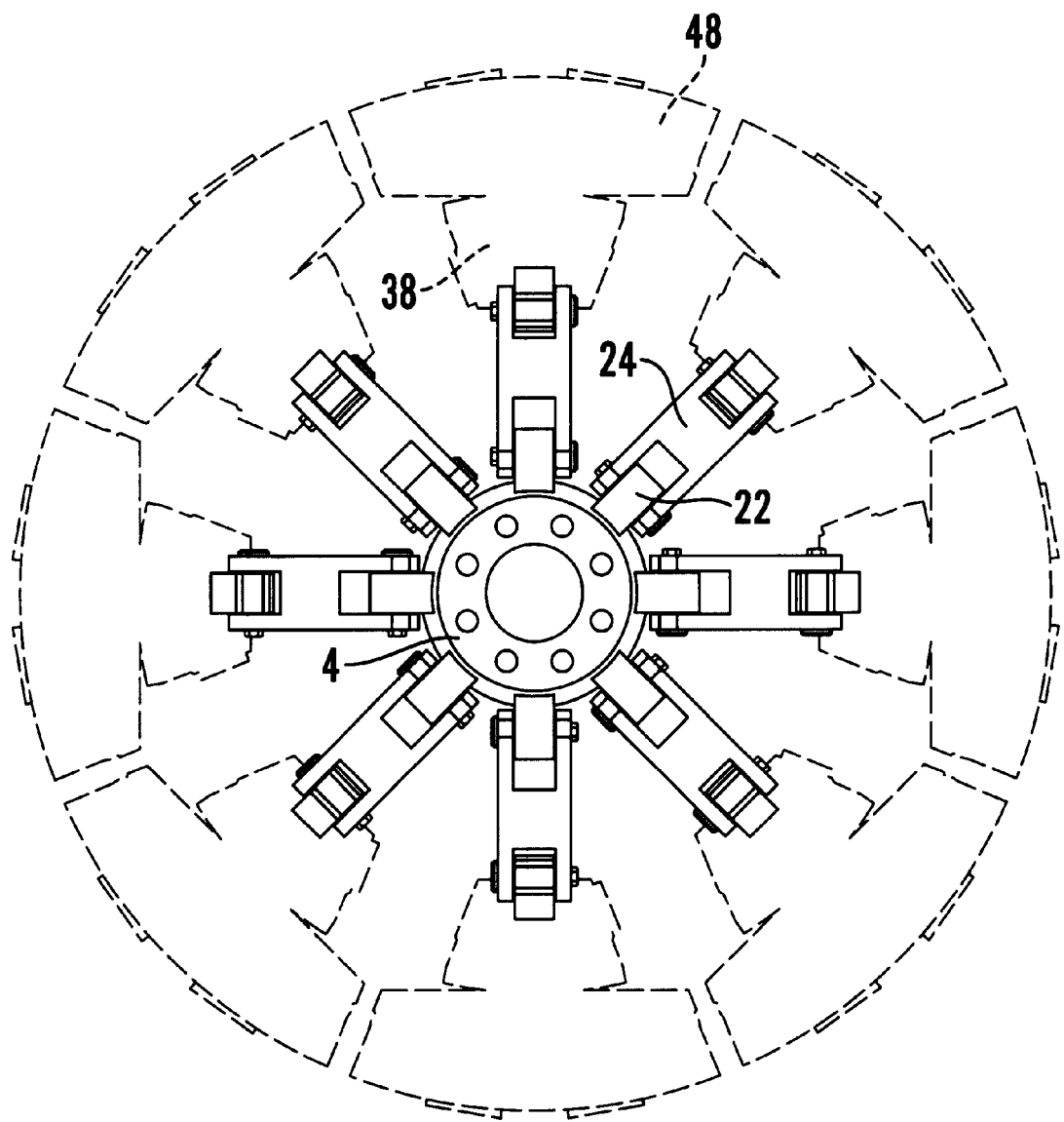
FIG. 4 is a front end view of the pig of FIG. 1 with the drive plate removed.

Referring to FIG. 3, there is shown a pipeline tapering from a nominal bore of 1219 mm to a nominal bore of 914 mm by way of a tapering section 54. The pig is shown within the tapering section 54, the arrangement of the invention being such that contact of the bristles with the inner wall of the pipeline is maintained regardless of the diameter of the inner wall within the range 914 mm to 1219 mm. More particularly the front slider 4, front springs 6 and front link arms 24 co-operate to urge the bristles of the front bristle set 44 into engagement with the reduced diameter extent of the inner wall of the tapering section 54 of the pipeline, while the rear slider 12, rear springs 14 and rear link arms 32 co-operate, independently of the front assembly, to urge the bristles of the rear bristle set 46 into engagement with the larger diameter extent of the inner wall of the tapering section 54 of the pipeline.

As the pig is moved along the pipeline, the return path elements 36 are manoeuvred by the link arms 24, 32 to maintain engagement of the bristle sets 44, 46 with the pipeline despite changes in the diameter of the pipeline.

It will also be appreciated that, because the return path elements 36 are all constrained to move together and to maintain a circular configuration about the centerline of the pig, individual elements 36 cannot therefore be damaged on passing T-connections or the like to the pipeline under inspection.

Thus the pig of the invention can be used to inspect pipelines with diameters within a predetermined range and regardless of variations of diameter within said range, and regardless of the numbers of, and locations of, connecting pipelines.

It is not uncommon for pipelines to incorporate dents or other non-circular features which present asymmetrically reduced diameters to the inspection pigs. In such circumstances, the or each return path element 36 engaging the dent is urged radially inwardly of the pipeline by the dent, the free ends of the bristles maintaining contact with the dent. As a consequence of the construction of the pig of the invention the diametrically-opposite return path element and all the other return path elements 36 are correspondingly moved radially inwards of the pipeline, the pig temporarily being offset from the normal centerline of the pipeline.

In order to maintain the required magnetic contact with the pipeline, the bristles of the bristle sets 44, 46 are relatively long and are such as to maintain engagement with the inner wall of the pipeline for all anticipated dents or other non-circular features.

More particularly, bristle length is determined by two fundamental limits. The upper limit is set by the desired deflection in the largest bore for which the pig is to be used. We have currently chosen a 10% deflection of the bristle free length under normal inspection of a pipeline with an internal diameter of 1199 mms.

The anticipated maximum dent capable of being accommodated by the illustrated pig reduces the diameter of the pipeline at the region of the dent to 1077 mm, and we provide a 50% deflection of the bristles at this region.

Thus a 40% deflection of two opposed bristle sets is equal to the differences between the largest diameter for which the pig is to be used, and the diameter at the dent—i.e. 1199 mm−1077 mm=122 mm for two bristle sets=61 mm for each bristle set. Thus, as 40% deflection is equal to 61 mm, the desired bristle length is 152 mm.

Such a bristle length has been found to be able to deal with the maximum limit of non-circularity specified for the pig, the two bristle sets lying diametrically across the duct being highly compressed (50%) but the other bristle sets maintaining contact with the inner wall of the pipeline.

Figure 5A:
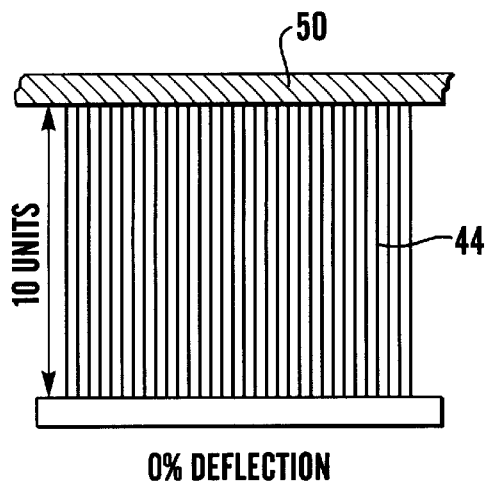
FIGS. 5a, 5b and 5c are schematic illustrations of bristle deflections of a pig according to the invention.
Figure 5B:
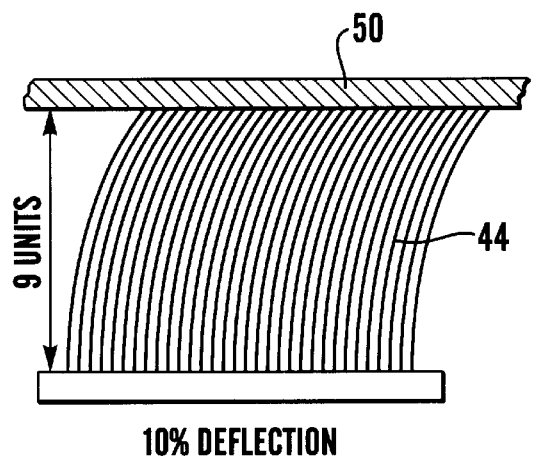
Figure 5C:
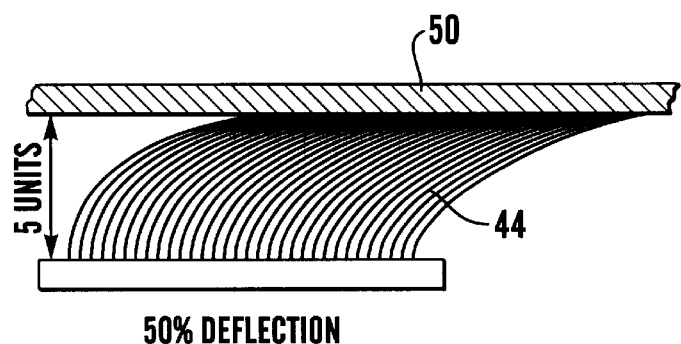

FIGS. 5a to 5c illustrate the above concept.

By way of further explanation, the force versus deflection characteristic of the return path mechanism is of great importance. With an incorrect force versus deflection characteristic, the pig may not be able successfully to negotiate either dents or T-connections.

The geometry of the mechanism is designed in such a way as to apply a bristle contact load in smaller pipe diameters of a similar magnitude to the bristle contact load applied in larger pipe diameters.

The preferred pig of the invention relies upon the correct balance of forces applied to the bristle sets. Consider what would happen if the force applied by the mechanism-to the bristle sets increased linearly with the radial travel of the mechanism. A spring applied directly between the central body 2 and the underside of the return path elements 36 would comprise such a mechanism. As the pig travelled into smaller pipe diameters, the contact load applied by the mechanism to the bristle sets 44, 46 would increase. Therefore the deflection of the bristle sets 44, 46 would increase. This would make dent passing much more difficult, because all bristle sets 44, 46 would already be highly compressed. In addition, the load trying to force a return path element 36 out into a small pipe diameter T would be high, and therefore more difficult to contain. In addition, bristle wear would be high in the smaller pipe diameter.

The mechanism lends itself ideally to the provision of a force versus deflection characteristic that applies very similar bristle contact loads in both large and small pipe diameters within the range. Dent and T-connection passing is therefore achieved in a similar manner in all pipe sizes within the range.

The front and rear drive elements 26 and 34 are designed to be able to be used in pipelines within a range of bores without any increase in drag or wear despite their use in smaller diameter pipelines within the range, and are the subject of a co-pending patent application.

In the illustrated arrangements, link arms 56 attach the return path elements 36 to the rear drive element support and hence to the body 2. Link arms 56 are necessary primarily to apply the rear drive load at a shallow angle through to the return path elements 36. However, such link arms 56 also improve the stability of the return path mechanism. Without link arms 56, the return path elements 36 are not tied directly to the body 2. As the pig moves, the drag on the return path elements 36 would tend to compress rear springs 14 and relax the front spring 6. Return path drag is large, and therefore this difference in spring set compressions could be large. In addition, return path drag is not constant, and therefore without link arms 56 the return path elements 36 would, to an extent, shuffle around erratically relative to the pig body 2. Link arms 56 assure stability of the return path elements 36 relative to the pig body 2.

We claim:

1. A pipeline pig for a pipeline including:
   a central body member having a front extent and a rear extent,
   a plurality of circumferentially spaced return path elements surrounding said body member and each extending axially relative to the body member, each return path element including
      a pair of axially spaced magnets from each of which projects a metallic bristle set the bristles of which have free ends, and
   a connecting means for connecting the return path elements to the body member whereby the free ends of the bristles, in use, resiliently engage an inner wall of the pipeline, the connecting means comprising
      a front carrier member mounted on, to be axially slidable relative to, the front extent of the body member and resiliently urged towards the rear extent of the body member,
      a rear carrier member mounted on, to be axially slidable relative to, the rear extent of the body member and resiliently urged towards the front extent of the body member, and,
      for each return path element, a front link pivotally interconnecting a front of the return path element and the front carrier member, and a rear link pivotally interconnecting a rear of the return path element and the rear carrier member, and
      wherein the front and rear carrier members are resiliently urged towards one another by one or a plurality of coil springs reacting between a front of the body member and a front of the front carrier member and between a rear of the body member and a rear of the rear carrier member respectively.

2. A pipeline pig as claimed in claim 1,
   wherein at least the front and rear extents of the central body member are hollow and of circular cross-section, and
   wherein the front and rear carrier members each are of generally cylindrical shape to be a sliding fit in the front and rear extents of the body member respectively.

3. A pipeline pig as claimed in claim 2,
   wherein one end of each link is pivotally connected to the associated carrier member and the other end of each link is pivotally connected to the associated return path element, and
   wherein the front and rear extents of the body member are provided with a plurality of axially extending, circumferentially spaced slots one for each link to accommodate the axial sliding movement of the one ends of the links.

4. A pipeline pig as claimed in claim 1,
   wherein one end of each link is pivotally connected to the associated carrier member and the other end of each link is pivotally connected to the associated return path element, and wherein the front and rear extents of the body member are provided with a plurality of axially extending, circumferentially spaced slots one for each link to accommodate the axial sliding movement of the one ends of the links.

5. A pipeline pig for a pipeline including:

a central body member having a front extent and a rear extent, a plurality of circumferentially spaced return path elements surrounding said body member and each extending axially relative to the body member, each return path element including a pair of axially spaced magnets from each of which projects a metallic bristle set the bristles of which have free ends, and a connecting means for connecting the return path elements to the body member whereby the free ends of the bristles, in use, resiliently engage an inner wall of the pipeline, the connecting means comprising a front carrier member mounted on, to be axially slidable relative to, the front extent of the body member and resiliently urged towards the rear extent of the body member, a rear carrier member mounted on, to be axially slidable relative to, the rear extent of the body member and resiliently urged towards the front extent of the body member, and, for each return path element, a front link pivotally interconnecting a front of the return path element and the front carrier member, and a rear link pivotally interconnecting a rear of the return path element and the rear carrier member, and wherein at least the front and rear extents of the central body member are hollow and of circular cross-section, and wherein the front and rear carrier members each are of generally cylindrical shape to be a sliding fit in the front and rear extents of the body member respectively.

6. A pipeline pig as claimed in claim 5, wherein one end of each link is pivotally connected to the associated carrier member and the other end of each link is pivotally connected to the associated return path element, and wherein the front and rear extents of the body member are provided with a plurality of axially extending, circumferentially spaced slots one for each link to accommodate the axial sliding movement of the one ends of the links.

7. A pipeline pig for a pipeline including:

a central body member having a front extent and a rear extent, a plurality of circumferentially spaced return path elements surrounding said body member and each extending axially relative to the body member, each return path element including a pair of axially spaced magnets from each of which projects a metallic bristle set the bristles of which have free ends, and a connecting means for connecting the return path elements to the body member whereby the free ends of the bristles, in use, resiliently engage an inner wall of the pipeline, the connecting means comprising a front carrier member mounted on, to be axially slidable relative to, the front extent of the body member and resiliently urged towards the rear extent of the body member, a rear carrier member mounted on, to be axially slidable relative to, the rear extent of the body member and resiliently urged towards the front extent of the body member, and, a for each return path element, a front link pivotally interconnecting a front of the return path element and the front carrier member, and a rear link pivotally interconnecting a rear of the return path element and the rear carrier member, and wherein one end of each link is pivotally connected to the associated carrier member and the other end of each link is pivotally connected to the associated return path element, and wherein the front and rear extents of the body member are provided with a plurality of axially extending, circumferentially spaced slots one for each link to accommodate the axial sliding movement of the one ends of the links.

\* \* \* \* \*